United States Patent
Stan

(10) Patent No.: US 11,947,443 B2
(45) Date of Patent: *Apr. 2, 2024

(54) ROBOTIC PROCESS AUTOMATION (RPA) DEBUGGING SYSTEMS AND METHODS

(71) Applicant: UiPath Inc., New York, NY (US)

(72) Inventor: Gheorghe C. Stan, Bucharest (RO)

(73) Assignee: UiPath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,880

(22) Filed: Apr. 4, 2022

(65) Prior Publication Data
US 2022/0229762 A1    Jul. 21, 2022

Related U.S. Application Data

(63) Continuation of application No. 16/949,291, filed on Oct. 23, 2020, now Pat. No. 11,294,793.

(51) Int. Cl.
*G06F 11/36* (2006.01)

(52) U.S. Cl.
CPC .................. *G06F 11/362* (2013.01)

(58) Field of Classification Search
USPC ................................. 717/124–141
See application file for complete search history.

(56) References Cited

U.S. PATENT DOCUMENTS

| | | | | |
|---|---|---|---|---|
| 5,127,103 A * | 6/1992 | Hill | ..................... | G06F 11/3636 714/E11.212 |
| 5,783,834 A * | 7/1998 | Shatas | ............... | H01L 21/67778 414/941 |
| 6,115,650 A * | 9/2000 | Demarest | ......... | A61B 17/06004 901/7 |
| 6,519,766 B1 * | 2/2003 | Barritz | ................ | G06F 11/3466 717/130 |
| 7,039,654 B1 * | 5/2006 | Eder | ...................... | G06Q 10/06 |
| 7,328,202 B2 * | 2/2008 | Huang | ................ | G06F 11/3616 706/2 |
| 7,490,319 B2 * | 2/2009 | Blackwell | ........... | G06F 11/3664 717/124 |
| 7,716,632 B2 * | 5/2010 | Covely, III | ......... | G06F 11/3072 717/136 |
| 8,402,313 B1 * | 3/2013 | Pleis | ..................... | G06F 11/273 714/724 |

(Continued)

OTHER PUBLICATIONS

Dobrica, "Robotic Process Automation Platform UiPath", ACM, pp. 1-2 (Year: 2022).*

(Continued)

*Primary Examiner* — Anil Khatri
(74) *Attorney, Agent, or Firm* — Law Office of Andrei D Popovici, PC

(57) ABSTRACT

In some embodiments, a robotic process automation (RPA) robot is configured to identify a runtime target of an automation activity (e.g., a button to click, a form field to fill in, etc.) by searching a user interface for a UI element matching a set of characteristics of the target defined at design-time. When the target identification fails, some embodiments display an error message indicating which target characteristic could not be matched. Some embodiments further display for selection by the user a set of alternative target elements of the runtime interface.

9 Claims, 11 Drawing Sheets

(56) References Cited

U.S. PATENT DOCUMENTS

| | | | | |
|---|---|---|---|---|
| 9,671,777 | B1* | 6/2017 | Aichele | B25J 9/1666 |
| 10,747,875 | B1* | 8/2020 | Stoler | H04L 9/3247 |
| 11,055,885 | B1* | 7/2021 | Schwaiger | G06T 11/206 |
| 11,294,793 | B1* | 4/2022 | Stan | G06F 11/362 |
| 11,334,471 | B1* | 5/2022 | Stocker | G06F 11/3664 |
| 11,672,614 | B1* | 6/2023 | Roh | G16H 50/20 |
| | | | | 382/153 |
| 11,707,837 | B2* | 7/2023 | Oleynik | G05B 19/42 |
| | | | | 700/250 |
| 11,709,766 | B2* | 7/2023 | Stocker | G06F 11/3684 |
| | | | | 717/124 |
| 11,715,007 | B2* | 8/2023 | Dalli | G06N 3/006 |
| | | | | 706/15 |
| 2020/0073686 | A1* | 3/2020 | Hanke | G06F 18/22 |

OTHER PUBLICATIONS

Kedziora et al, "Turning Robotic Process Automation onto Intelligent Automation with Machine Learning", ACM, pp. 1-5 (Year: 2023).*

Chacón-Montero et al, Towards a Method for Automated Testing in Robotic Process Automation Projects:, IEEE, pp. 42-47 (Year: 2019).*

Yadav et al, "Path Forward for Automation in Robotic Process Automation Projects: Potential Process Selection Strategies", IEEE, pp. 801-805 (Year: 2022).*

Cernat et al, "Towards Automated Testing of RPA Implementations", ACM, pp. 21-24 (Year: 2020).*

\* cited by examiner

ROBOTIC PROCESS AUTOMATION (RPA) DEBUGGING SYSTEMS AND METHODS

RELATED APPLICATIONS

This application is a continuation of U.S. patent application Ser. No. 16/949,291, filed on Oct. 23, 2020, entitled "Robotic Process Automation (RPA) Debugging Systems and Methods," and scheduled to issue on Apr. 5, 2022 as U.S. Pat. No. 11,294,793, which is herein incorporated by reference.

BACKGROUND

The invention relates to robotic process automation (RPA), and in particular to facilitating the debugging of software robots.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming and/or debugging of robots via graphical user interface (GUI) tools, instead of coding per se. There is a strong interest in making such GUI tools as intuitive and user-friendly as possible, to attract a broad audience of developers.

SUMMARY

According to one aspect, a robotic process automation (RPA) method comprises employing at least one hardware processor of a computer system to execute a software robot configured to apply an RPA activity to a target element of a user interface (UI). The RPA activity mimics an interaction of a human operator with the target element. Executing the software robot comprises: in response to receiving an RPA script indicating a plurality of characteristics of the target element, searching the UI for UI elements matching all of the plurality of characteristics of the target element; and in response to searching the UI, when no element of the UI matches all of the plurality of characteristics of the target element, displaying an error message to a user of the computer system, the error message selectively showing at least one characteristic of the plurality of characteristics of the target element that is not matched in any UI element of the UI.

According to another aspect, a computer system comprises at least one hardware processor configured to execute a software robot configured to apply a robotic process automation (RPA) activity to a target element of a user interface (UI). The RPA activity mimics an interaction of a human operator with the target element. Executing the software robot comprises: in response to receiving an RPA script indicating a plurality of characteristics of the target element, searching the UI for UI elements matching all of the plurality of characteristics of the target element; and in response to searching the UI, when no element of the UI matches all of the plurality of characteristics of the target element, displaying an error message to a user of the computer system, the error message selectively showing at least one characteristic of the plurality of characteristics of the target element that is not matched in any UI element of the UI.

According to another aspect, a non-transitory computer-readable medium stores instructions which, when executed by at least one hardware processor of a computer system, cause the computer system to execute a software robot configured to apply a robotic process automation (RPA) activity to a target element of a user interface (UI). The RPA activity mimics an interaction of a human operator with the target element. Executing the software robot comprises: in response to receiving an RPA script indicating a plurality of characteristics of the target element, searching the UI for UI elements matching all of the plurality of characteristics of the target element; and in response to searching the UI, when no element of the UI matches all of the plurality of characteristics of the target element, displaying an error message to a user of the computer system, the error message selectively showing at least one characteristic of the plurality of characteristics of the target element that is not matched in any UI element of the UI.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
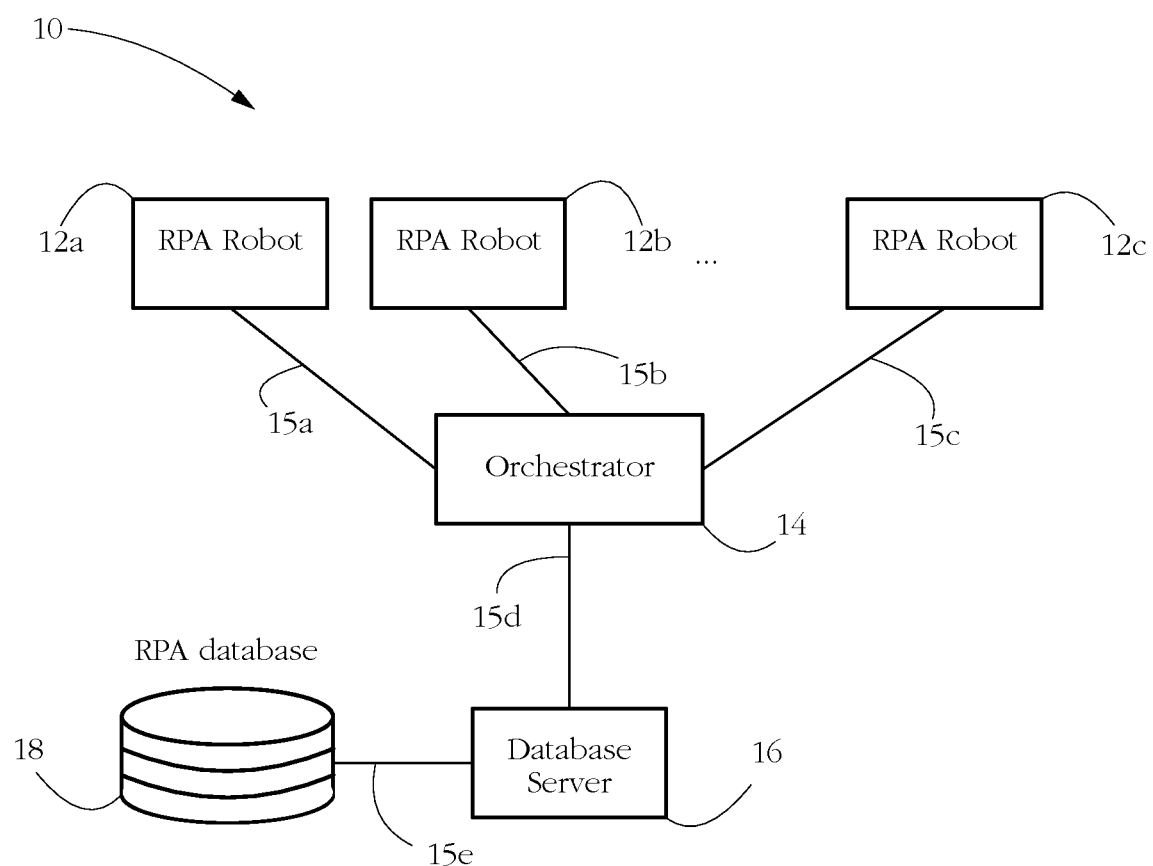
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a target process. A workflow typically comprises a sequence of custom automation steps, herein deemed activities. Workflows may be nested and/or embedded. Each activity may include an action performed by the robot, such as clicking a button, reading a file, writing to a spreadsheet cell, etc. In some embodiments, RPA design application 30 exposes a user interface and set of tools that give the developer control of the execution order and the relationship between activities of a workflow. One commercial example of an embodiment of RPA design application 30 is UiPath StudioX™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
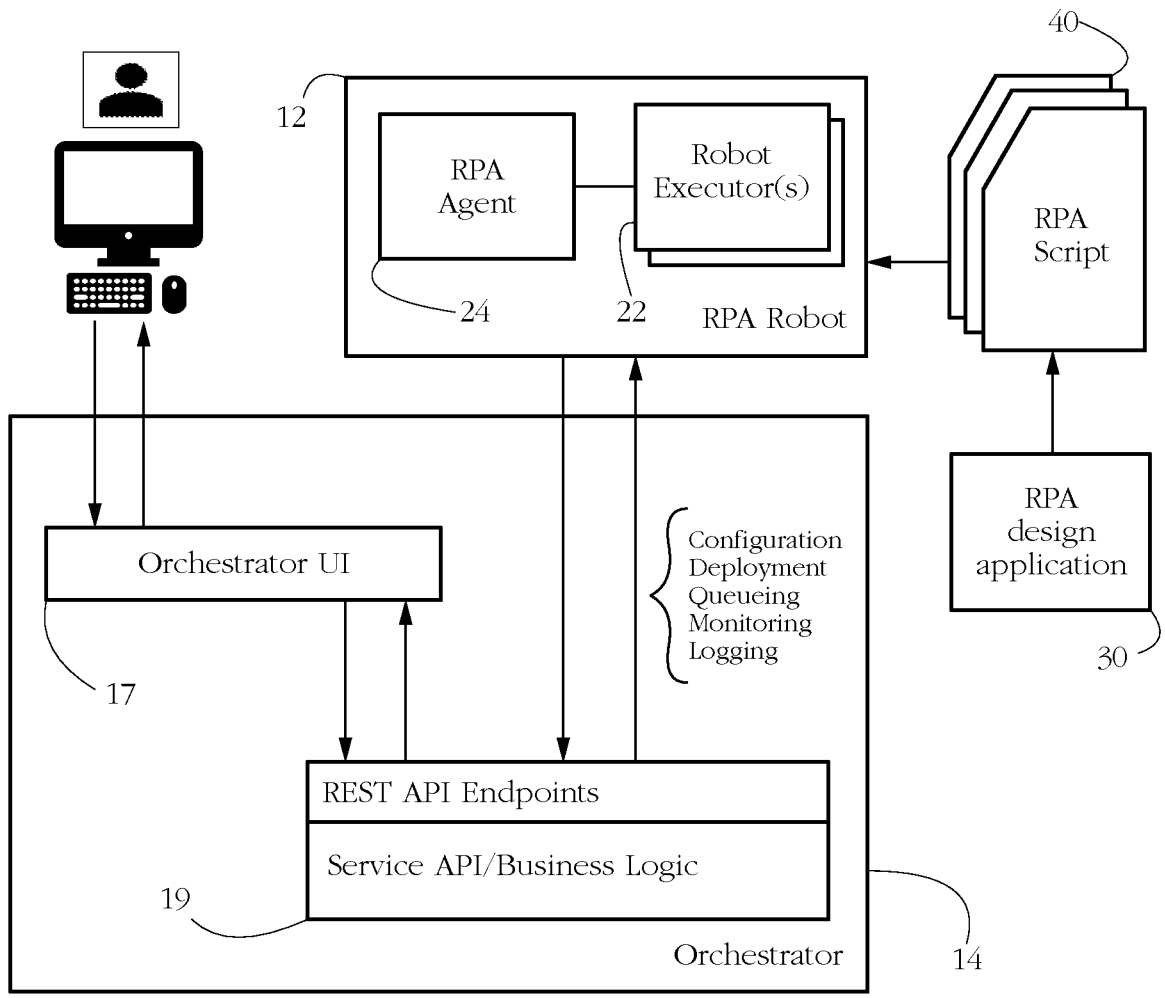
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), Javascript® Object Notation (JSON), or a programming language such as C #, Visual Basic®, Java®, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12a-c (FIG. 1), which may be further controlled and coordinated by an orchestrator 14. Robots 12a-c and orchestrator 14 may each comprise a plurality of computer programs, which may or may not execute on the same physical machine. Exemplary commercial embodiments of robots 12a-c and orchestrator 14 include UiPath Robots™ and UiPath Orchestrator™, respectively. Types of robots 12a-c include, but are not limited to, attended robots, unattended robots, development robots (similar to unattended robots, but used for development and testing purposes), and non-production robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12a-c. Provisioning may include creating and maintaining connections between robots 12a-c and orchestrator 14. Deployment may include ensuring the correct delivery of software (e.g, RPA scripts 40) to robots 12a-c for execution. Configuration may include maintenance and delivery of robot environments and workflow configurations. Queueing may include providing management of queues and queue items. Monitoring may include keeping track of robot state and maintaining user permissions. Logging may include storing and indexing logs to a database and/or another storage mechanism (e.g., SQL, ElasticSearch®, Redis®). Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows® Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows® environment, robot 12 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows Server® 2012), multiple robots may be running at the same time, each in a separate Windows® session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several workflows concurrently. RPA agent 24 (e.g., a Windows® service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14. In turn, orchestrator 14 may use the channel to transmit acknowledgements, job requests, and other data such as RPA scripts 40 to robot 12.

Orchestrator 14 may execute on a server side, possibly distributed over multiple physical machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups, assigning workflows to robots, adding/removing data in queues, scheduling jobs to run unattended, analyzing logs per robot or workflow, etc. Orchestrator UI 17 may use Hypertext Markup Language (HTML), JavaScript® (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12a-c, robot groups, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch®, and Redis®, among others. In some embodiments, data is to gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15a-e.

Figure 3:
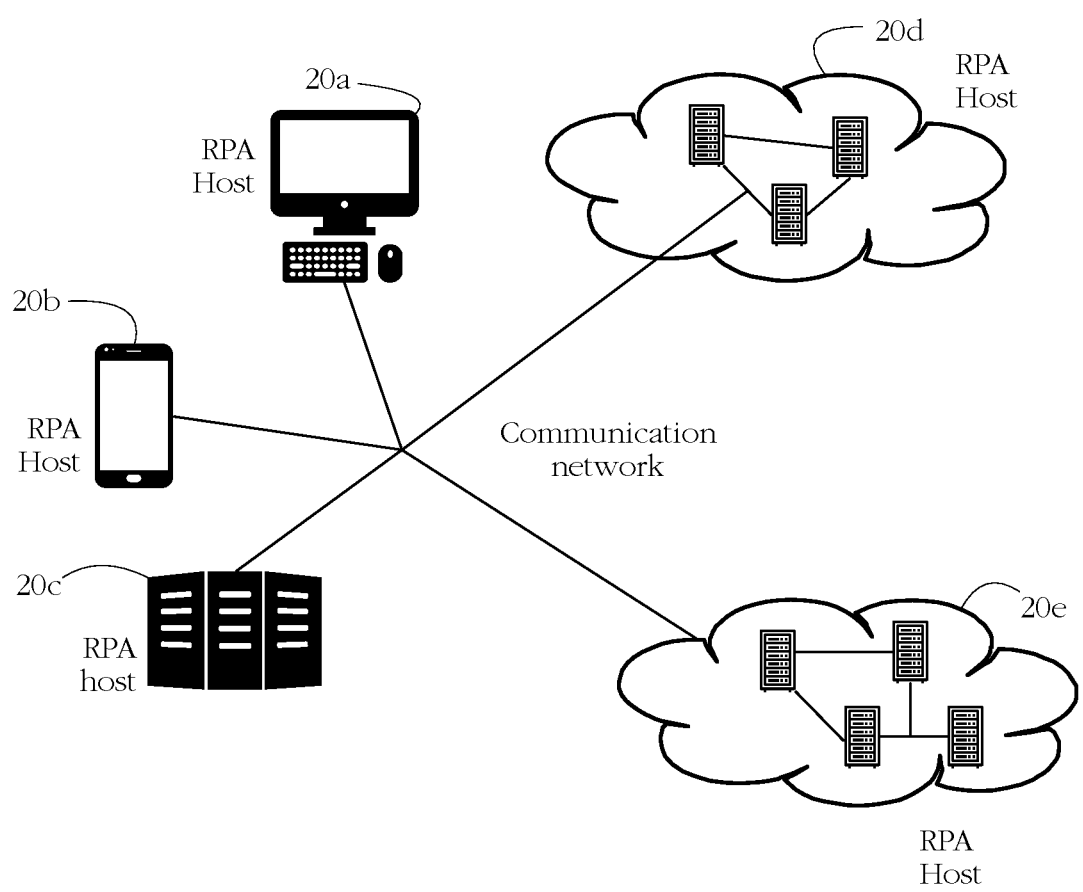
FIG. 3 shows a variety of RPA host systems according to some embodiments of the present invention.

A skilled artisan will understand that various components of RPA environment 10 may be implemented and/or may execute on distinct host computer systems (physical appliances and/or virtual machines.) FIG. 3 shows a variety of such RPA host systems 20a-e according to some embodiments of the present invention. Each host system 20a-e represents a computing system (e.g. an individual computing appliance, or a set of interconnected computers) having at least a hardware processor, a memory unit and a network adapter enabling the respective RPA host to connect to a computer network and/or to other computing devices. Exemplary RPA hosts 20a-c include personal computers, laptop and tablet computers, mobile telecommunication devices (e.g., smartphones), and corporate mainframe computers, among others. Other exemplary hosts illustrated as hosts 20d-e include cloud computing platforms such as server farms operated by Amazon AWS® and Microsoft Azure®. A cloud computing platform comprises a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure® SDK and AWS® SDK, among others.

Figure 4:
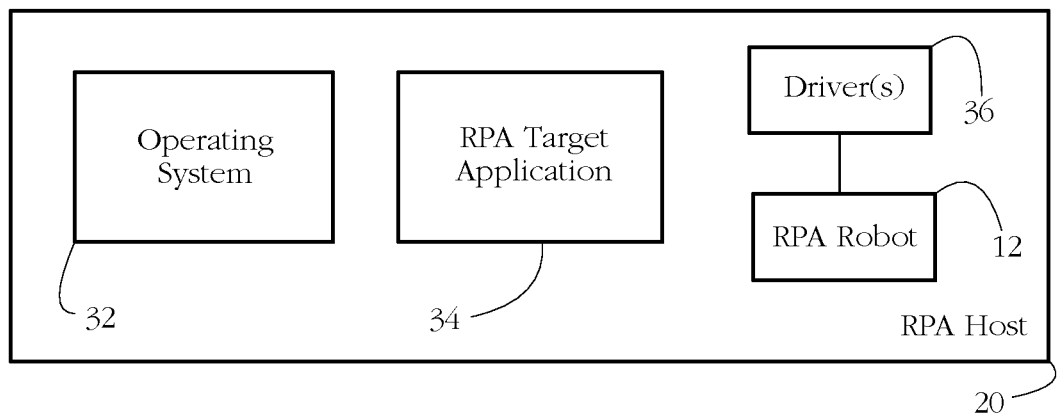
FIG. 4 shows exemplary RPA components executing on an RPA host according to some embodiments of the present invention.

FIG. 4 shows exemplary software executing on an RPA host 20 according to some embodiments of the present invention. The illustrated RPA host 20 generically represents any of RPA hosts 20a-e in FIG. 3. In some embodiments, beside an RPA robot 12, RPA host 20 executes an operating system (OS) 32 and an instance of an RPA target application 34, i.e., the software application targeted for automation by robot 12. In some embodiments that employ hardware virtualization technologies, some or all of the illustrated components may execute within a virtual machine (VM).

OS 32 may comprise any widely available operating system such as Microsoft Windows®, MacOS®, Linux®, iOS®, or Android®, among others, comprising a software layer that interfaces between application 34 and the hardware of RPA host 20. RPA target application 34 generically represents any computer program used by a human operator to carry out a task. Exemplary applications 34 include, among others, a word processor, a spreadsheet application, a graphics application, a browser, a social media application, a gaming application, and an electronic communication application.

In some embodiments, robot 12 carries out user interface automation activities by interfacing with a set of drivers 36 executing on the respective host. Driver(s) 36 generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, etc. Some such drivers 36 form a part of operating system 32. Others may implement various application-specific aspects of a user's interaction with complex target applications 34 such as SAP®, Citrix® virtualization software, Excel®, etc. Such drivers 36 may include, for instance, browser drivers, virtualization drivers, and enterprise application drivers, among others. Other exemplary drivers 36 include the Microsoft® WinAppDriver, XCTest drivers from Apple, Inc., and UI Automator drivers from Google, Inc.

Figure 5:
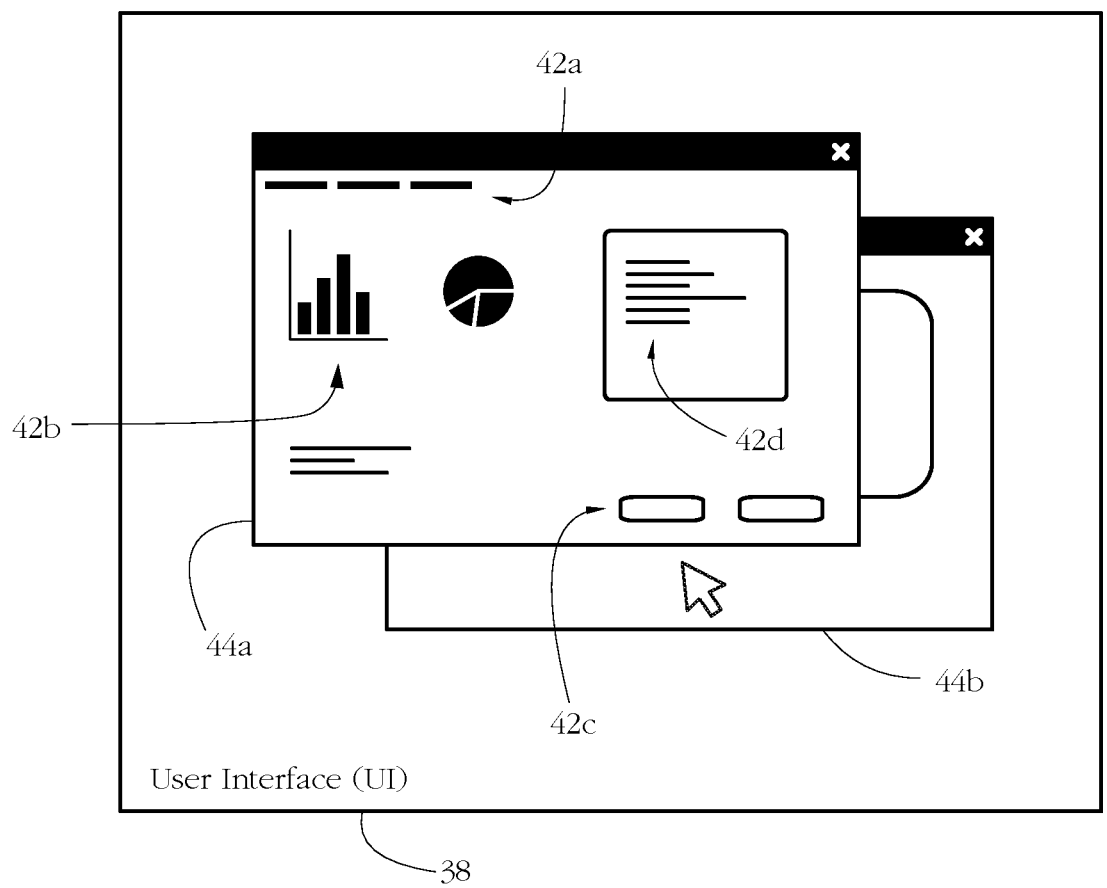
FIG. 5 shows an exemplary user interface (UI) having a plurality of UI elements according to some embodiments of the present invention.

RPA target application 34 is typically configured to expose a user interface (UI). A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. FIG. 5 shows such an exemplary UI 38 according to some embodiments of the present invention. Illustrative UI 38 has a set of exemplary windows 44a-b and a set of exemplary UI elements including a menu indicator 42a, an icon 42b, a button 42c, and a text box 42d. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computing device.

Some UI elements are interactive in the sense that acting on them (e.g., clicking button 42c) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/ application, and a completely different effect when executed in another window/application. So, although the operation/action/activity is the same (executing a click, pressing a combination of keyboard keys, writing a sequence of characters, etc.), the result of the respective action may depend substantially on the operand of the respective operation. An operand is herein defined as the UI element that is acted upon by a current activity such as a click or a keyboard event, or stated otherwise, the UI element selected to receive the respective user input. The terms 'operand' and 'target' are herein used interchangeably.

To enable a successful and ideally unambiguous identification by RPA robot 12, some embodiments of the present invention represent each element of a target UI by way of an element ID comprising a set of characteristics of the respective UI element. For instance, the element ID may comprise a set of attribute-value pairs that enable identification of the respective UI element, for instance as a specific object within a hierarchy of objects that the respective RPA host uses to represent and/or render the respective user interface. In some embodiments, element IDs are included in a source code of user interface 38, for instance as a set of attribute-value pairs. The term source code of a user interface is herein understood to denote a programmatic representation of a content displayed by the respective user interface. Source code may encompass a program/script written in a programming language, as well as a data structure residing in a memory of the respective RPA host. Exemplary source code comprises an HTML document which is rendered as a webpage by a web browser application.

Figure 6:
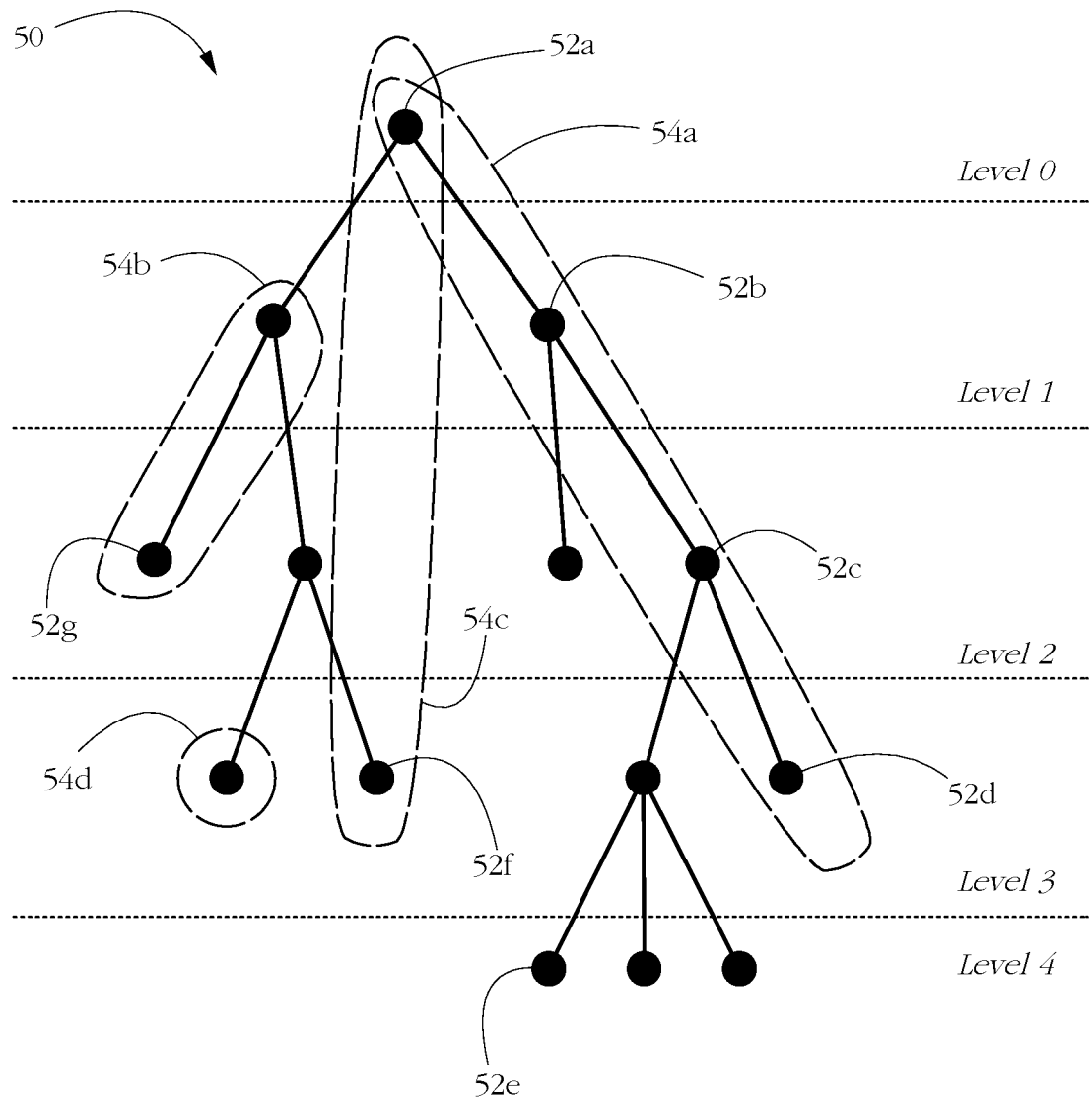
FIG. 6 shows an exemplary UI tree having a plurality of nodes, and a plurality of genealogies according to some embodiments of the present invention.

In modern computing platforms, the operating system typically represents each user interface as a hierarchical data structure commonly known as a UI tree. An exemplary UI tree comprises a document object model (DOM) underlying a webpage rendered by a browser application. FIG. 6 shows an exemplary UI tree 50 having a plurality of nodes 52a-g. In some embodiments, each node 52a-g comprises an object representing a part of UI 38. UI tree 50 unfolds over multiple branching levels, wherein nodes located on one level are children objects of nodes located on a preceding level.

In an exemplary GUI, a root node 52a may represent an entire GUI window. Its descendant nodes, such as nodes 52b-g, may represent individual UI elements (e.g., text boxes, labels, form fields, buttons, etc.), or may represent groups of elements, distinct regions or blocks of the respective UI, etc. An intermediate node such as node 52b in FIG. 6 may represent a whole form, including all its input fields, labels and buttons. For instance, node 52b may represent a <form> or <fieldset> container of an HTML document. Another example of an intermediate node may represent a <div> or <span> HTML container. Yet another example of intermediate node comprises a header or footer of a document. End nodes such as 52d, 52e, 52f, and 52g (also known in the art as leaf nodes) are nodes that have no further children nodes, and may represent individual UI elements (e.g., a button, an individual label, an individual input field). In an example of a web browser UI, end nodes may represent individual images, hyperlinks, text paragraphs, etc.

In some embodiments, the element ID of a UI element comprises characteristics collectively indicating a location of a target node within UI tree 50, wherein the target node represents the respective UI element. Such element ID are also known in the art as selectors. Without loss of generality, the terms "element ID" and "selector" will herein be used interchangeably.

The location of the target node within the UI tree may be encoded as a directed graph connecting a subset of nodes of the UI tree and ending in the respective target node. Stated otherwise, the target node may be found by walking the UI tree from one node to the next, as indicated by the respective directed graph. In some embodiments, the subset of nodes specified in the element ID forms a genealogy, i.e., a line of descent through the UI tree wherein each node is either an ancestor or a descendant of another node. A few exemplary genealogies 74a-d are illustrated in FIG. 6, wherein end node 52f is a member of a genealogy 54c, for instance.

Figure 7:
FIG. 7 illustrates an exemplary element ID/selector according to some embodiments of the present invention.

In some embodiments as further illustrated in FIG. 7, an element ID 60 comprises an ordered sequence of node indicators 62a-d, each node indicator representing a node of the respective UI tree. The sequence traces a genealogical path through the UI tree, ending with the node/UI element represented by the respective element ID. Stated otherwise, each member of the sequence may represent a descendant (e.g., child node) of the previous member, and may have the following member as a descendant. In one such example, node indicators 62a-d may represent nodes 52a-d in FIG. 6, respectively. In an HTML example, an element ID representing an individual form field may indicate that the respective form field is a child of an HTML form, which in turn is a child of a specific section of a webpage, etc. The genealogy does not need to be complete: in FIG. 6, exemplary genealogy 54c comprises just the leaf and root node, but still identifies node 52f as a UI element displayed within the GUI window represented by root node 52a.

Figure 8:
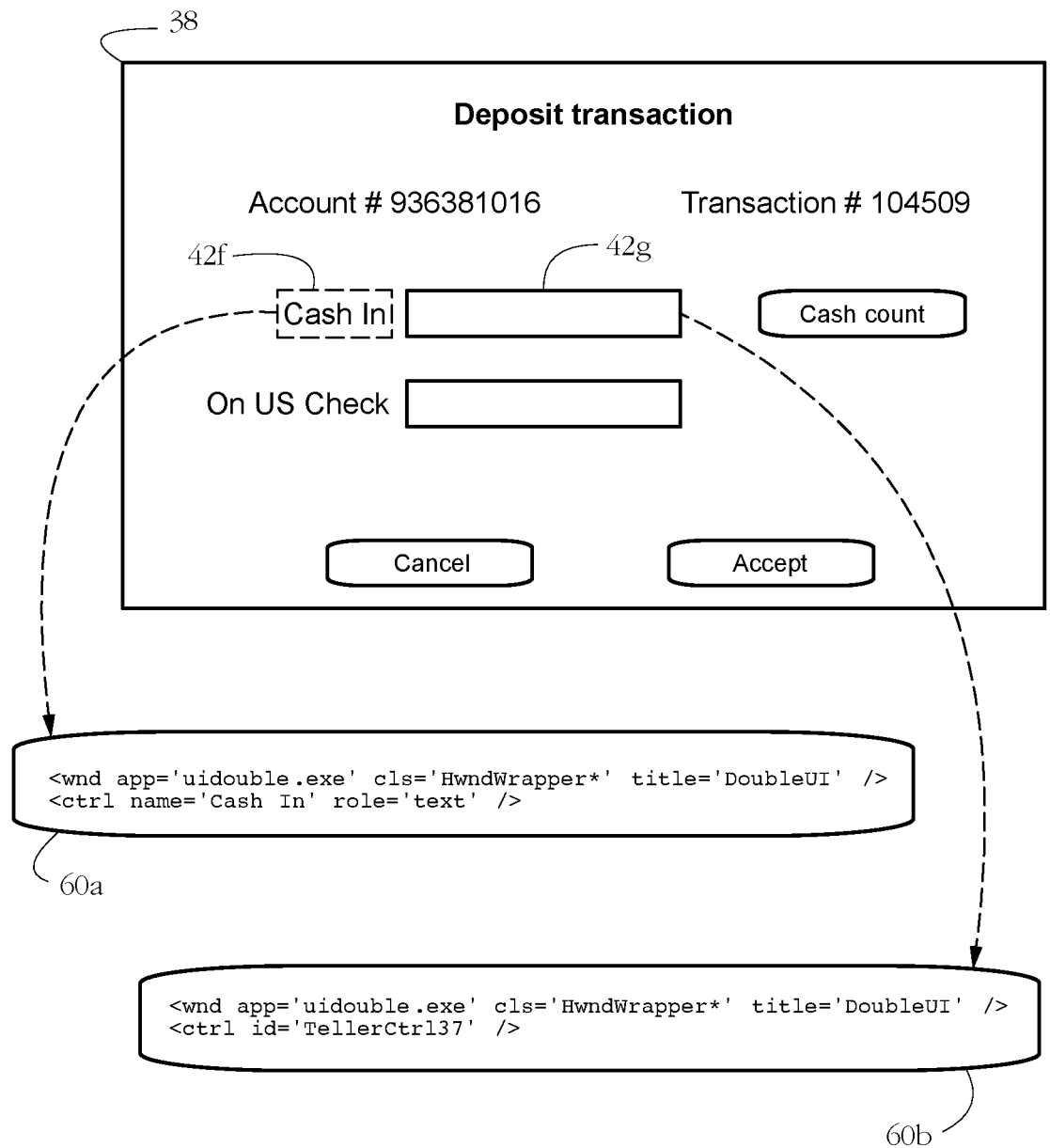
FIG. 8 illustrates another exemplary UI, wherein each of a set of UI elements is characterized by an element ID according to some embodiments of the present invention.

In embodiments as shown in FIG. 7, element ID 60 is formulated in a version of XML, each individual node indicator 62a-d comprising an XML tag. The first tag 62a represents a GUI window, while the last tag 62d represents the actual UI element identified by element ID 60 (in this case, a button). FIG. 8 shows another example according to some embodiments of the present invention, wherein a UI element 42f is represented by an element ID 60a and another UI element 42g is represented by an element ID 60b. Element ID's 60a-b share the first tag but differ in the second tag, which shows that their associated UI elements 42f-g are both part of the same group of UI elements (e.g., the same application window).

In general, each tag of an element ID/selector may consist of a sequence of characters, the sequence book-ended by implementation-specific delimiters (in the current example, each tag begins with < and ends with />). Each tag may comprise a set of attribute-value pairs encoding specific characteristics of the respective object. The format and content of such tags may vary according to the target application exposing the respective UI. For instance, an element ID identifying an element of a HTML document (e.g., web page) may read:

```
<html app='chrome.exe' title='Selectors - Just an example' />
<webctrl tag='H1' />
```

An exemplary element ID for a SAP™ UI element may read:

```
<wnd app='saplogon.exe' cls='SAP_FRONTEND_SESSION' title='SAP' />
<sap id='usr/txtRSYST-BNAME' />
```

An exemplary element ID for a Java™ UI element may read:

```
<wnd app='java.exe' cls='SunAwtFrame' title='SwingSet2'/>
<java role='page tab list' />
<java name='Internal Frames Demo' role='page tab' />
<java name='Internal Frame Generator' role='internal frame'/>
<java role='push button' idx='4' />
```

The format of element IDs illustrated above is provided only as an example; a skilled artisan will appreciate that there may be multiple other ways of representing a location of a specific node within a UI tree, beside a list of attribute-value pairs. Also, there may be alternative ways of encoding attribute-value pairs, beside XML.

The selector/element ID of a target UI element may be specified at design time by including an encoding of the respective selector in RPA script 40. At runtime, software robot 12 may attempt to identify the respective target UI element (herein deemed "runtime target") within a runtime instance of the UI exposed by RPA target application 34. In an example as illustrated in FIG. 8, RPA script 40 may instruct robot 12 to automatically type a particular amount into the 'Cash In' form field. To do this, robot 12 may need to identify the target of the writing activity, i.e., a runtime instance of the respective form field, illustrated as UI element 42g in FIG. 8. Some embodiments attempt such identification according to the element ID and/or according to other information such as an image of the respective UI element, a label displayed next to or on top of the respective UI element, etc. Matching the runtime element ID (e.g., 60b in FIG. 8) to an element ID provided in RPA script 40 may fail in situations wherein some characteristic features of the respective UI element have changed between design and runtime. When identification of the target fails, robot 12 may not be able to carry on with the respective automation. Therefore, in conventional RPA, execution of robot 12 is typically suspended and an error message may be displayed to the user and/or written to a log. However, debugging the robot may require understanding the cause of the fail, which may further require a level of knowledge of RPA software, user interfaces, and target application 34 which is expected to exceed that of the average developer. Some embodiments of the present invention are directed at providing tools for facilitating the debugging of software robots in situations where automation breaks down because of a failure to identify a runtime target.

Figure 9:
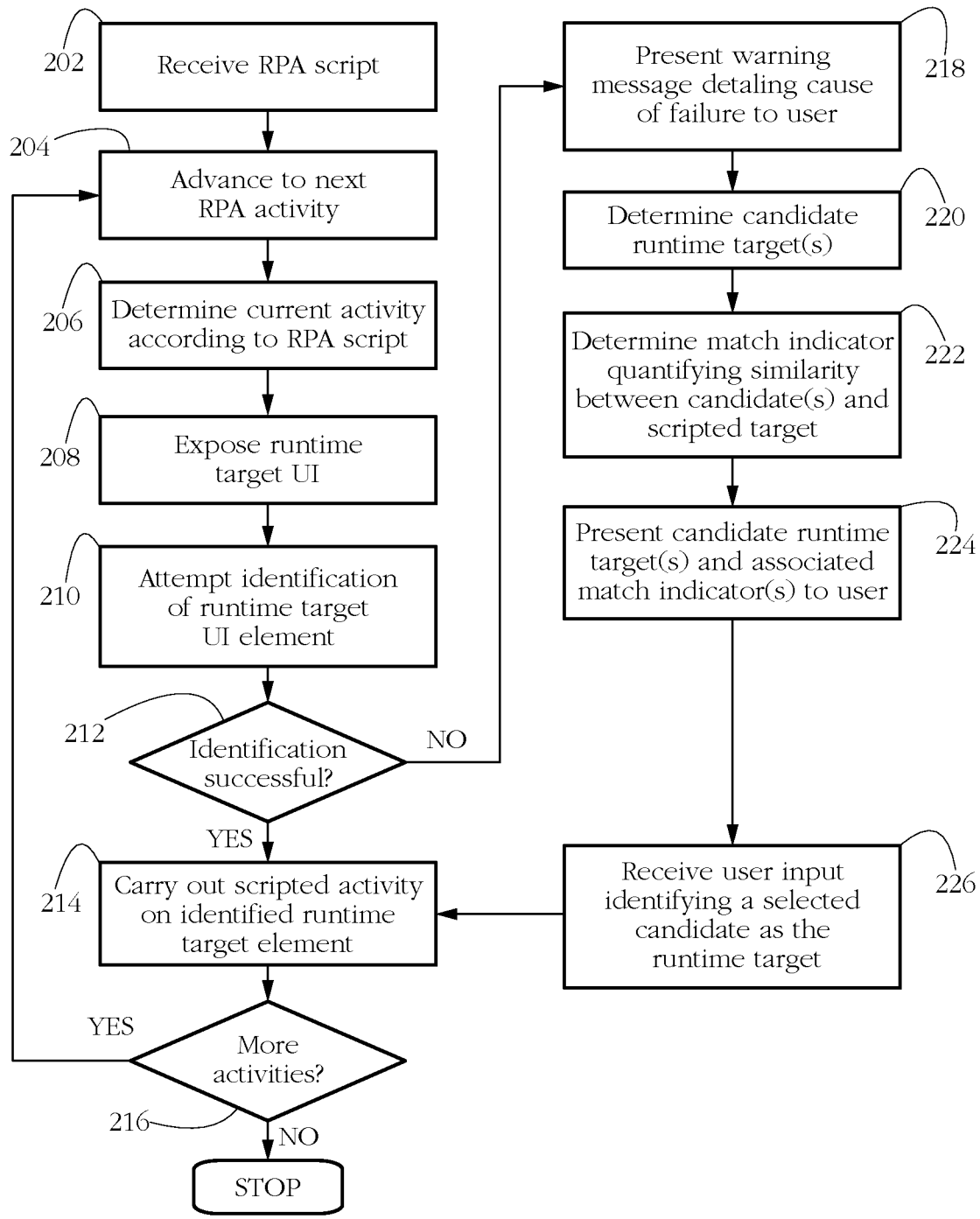
FIG. 9 shows an exemplary sequence of steps performed by the RPA robot according to some embodiments of the present invention.

FIG. 9 shows an exemplary sequence of steps performed by RPA robot at runtime, according to some embodiments of the present invention. In a step 202 robot 12 receives RPA script 40 encoding a sequence of activities. For each activity included in script 40, robot 12 may then identify the activity to be performed. Some RPA activities are applied to a user interface, so in a step 208 robot 12 may check whether the target UI interface is currently exposed, and if not, may employ drivers 36 to expose an instance of the target UI, for instance by invoking RPA target application 34 executing on the respective RPA host.

A further step 210 may attempt to identify the runtime target of the current RPA activity (e.g., the button to click, the form field to fill in, etc.). In some embodiments, target identification comprises attempting find within the runtime instance of the target UI an UI element having a selector that matches a selector described by script 40 as associated with the current activity. In the example in FIG. 8, wherein the current activity comprises writing to the 'Cash In' form field, step 212 may comprise searching the runtime instance of UI 38 for a UI element having selector 60b. Selector matching may comprise selecting a candidate UI element from the runtime UI, comparing attribute values of the design-time selector (specified in RPA script 40) with corresponding attribute values of the selector of the candidate UI element, and deciding that the design-time selector matches the runtime selector when all respective attribute values are identical. In an embodiment wherein selectors are represented as character strings (e.g., in XML or JSON), step 210 may comprise pre-processing the design-time and runtime selectors, for instance by removing certain characters (spaces, tag delimiters, carriage returns etc.), and deciding that the design-time selector matches the runtime selector when the character string representing the design time selector is identical to the character string representing the runtime selector.

When target identification is successful, i.e., a UI element with the right selector is found, in a step 214 robot 12 may employ drivers 36 to carry out the current activity (e.g., write a pre-determined value to the "Cash In" form field). Detailing step 214 goes beyond the scope of the present disclosure; carrying out the respective activity may use any RPA method known in the art.

When no UI element of the runtime target UI has a selector exactly matching the one specified in RPA script 40 (i.e., target identification fails), some embodiments may generate an error/warning message detailing a cause of the failure and present the error message to a user. Presenting the message may encompass any method of communicating information, such as displaying the message on an output device of the respective RPA host, transmitting the error message via a remote server to another device (e.g., smartphone), writing the message to a log, etc.

Figure 10:
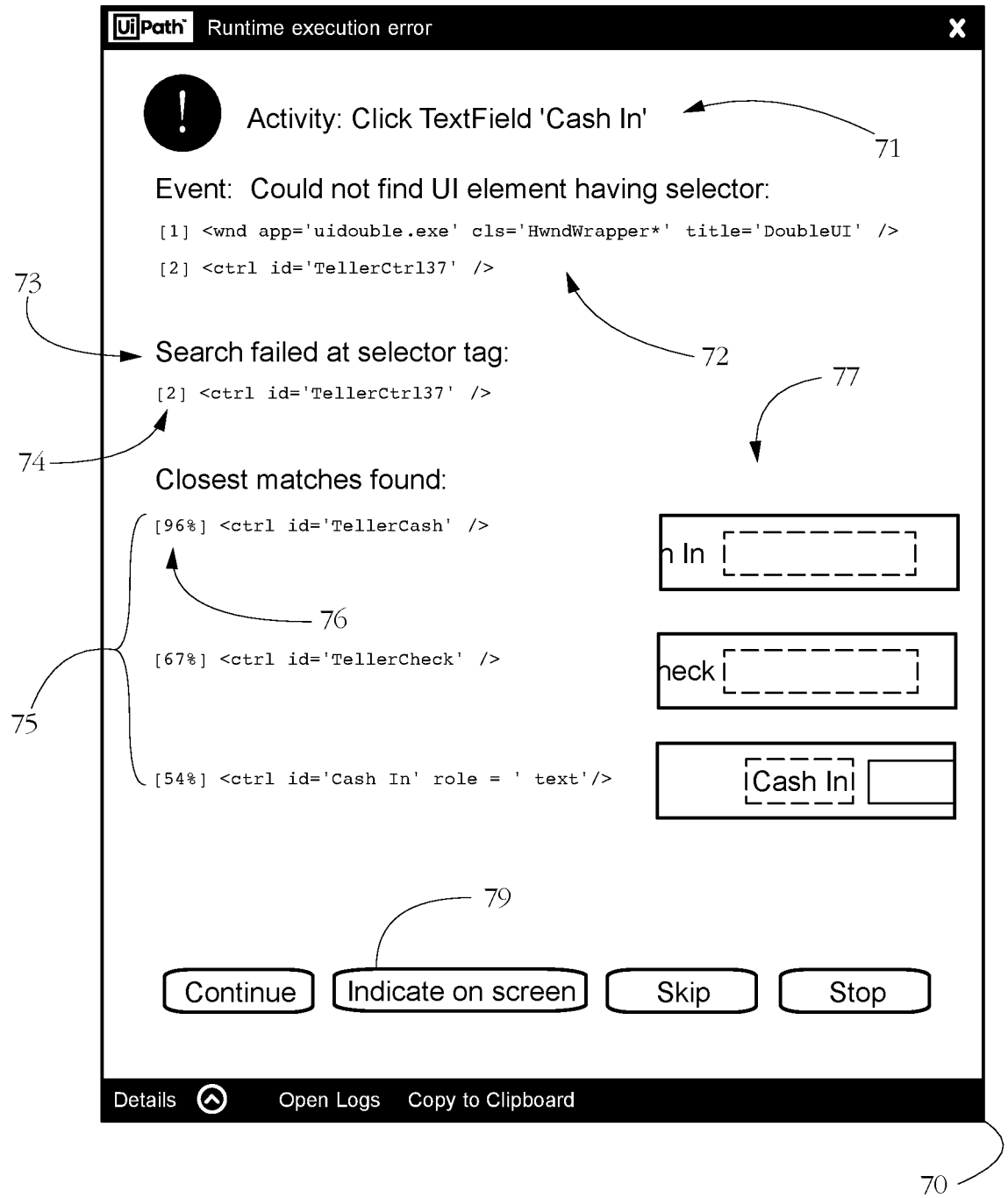
FIG. 10 shows an exemplary warning message displayed to a user in response to a failure to identify a runtime target UI element, according to some embodiments of the present invention.

FIG. 10 shows an exemplary error reporting window 70 displayed to a user/RPA developer, window 70 showing an exemplary error message according to some embodiments of the present invention. Window 70 may be displayed on an output device of the RPA host executing robot 12, or on an output device of a remote machine operated by an RPA developer debugging the respective robot. The illustrated content and on-screen presentation of the error message are meant as an example; an artisan will appreciate that there are many alternative manners of presenting and/or organizing such information. The presented error message may comprise a part 71 indicative of a type of RPA activity which caused the failure and/or which was executing when the failure occurred. Another message part 72 may indicate a cause of the failure. In the illustrated example, the cause comprises a failure to identify a UI element having the required selector. Part 72 may display at least a part of the respective design-time selector (as specified in RPA script 40). In alternative embodiments, the type of activity and/or the cause of failure may be indicated using numerical error codes, aliases, etc.

In some embodiments, the error message may further include a failure detail part 73 indicating which part/fragment of the design time selector could not be matched in the runtime instance of the target UI. In the example illustrated in FIGS. 8 and 10, the element ID of the 'Cash In' form field has changed between design time and runtime, the value of the 'id' attribute changing from 'TellerCtr137' to 'Teller-Cash'. Following the change, the design-time selector no longer matches the runtime selector of the target form field. In some embodiments, failure detail part 73 includes a set of node indicators (e.g., tags) of the design time selector which cannot be matched in the runtime instance of the target UI, as shown in FIG. 10. To further facilitate debugging, some embodiments include an intra-selector position indicator 74 indicative of a location of the mismatch within the respective selector. In the illustrated example, tags making up the design-time selector are marked with numbers indicating the position of each tag within the selector. The illustrated value of position indicator 74 thus indicates that the second tag of the selector could not be matched. In an alternative embodiment, the mismatched part(s) of the design-time selector may be visually emphasized with respect to the rest of the selector, for instance using a different color, font size, font style (e.g., bold) than the rest of the selector.

In yet another alternative embodiment, position indicator 74 may indicate a level of a UI tree where the mismatch occurs (see e.g., UI tree levels in FIG. 6) and/or a set of nodes of the design-time UI tree which could not be matched in the runtime UI tree. In such embodiments, failure detail part 73 of the error message may further include a graphical representation of at least a part of the design-time UI tree (i.e., UI tree of the UI on which robot 12 was designed), wherein the mismatched node(s) are visually emphasized, e.g., with a particular color, marker, size, etc.

In some embodiments, the error message may further include a target suggestion part 75 displaying a set of alternative runtime targets for the current activity, the alternative targets selected according to similarity to the design-time target. Some embodiments rely on the observation that displaying a list of alternative targets may further facilitate debugging in at least two ways. First, it may enable a developer to uncover differences between the design-time and runtime user interfaces, or stated otherwise, to determine whether and how the respective interface has changed between design time and runtime. Second, displaying alternative targets may provide a straightforward and intuitive way of fixing the robot by redirecting it to the correct target element so that it may continue executing the current automation.

To display such target suggestions, in a step 220 (FIG. 9), RPA robot 12 may select a set of target candidate UI elements from the runtime UI. Target candidates may be selected by various procedures. One exemplary procedure comprises selecting candidates whose selectors partially match the design-time selector, in the sense that the candidate's selector exactly matches the design-time selector in at least a subset of node indicators/tags. With a design-time selector as illustrated in FIG. 7, some embodiments may be configured to select candidate UI elements from the runtime UI whose selectors match at least node indicators 62a and 62b, for instance. An exemplary candidate selection procedure implementing such a criterion may comprise walking the UI tree of the runtime UI down to the last matched node (i.e., to the last node of the design-time selector which can be exactly matched in a runtime selector), and selecting as candidates all UI elements representing end-leaves that have the matched node as ancestor. To illustrate with an exemplary situation as illustrated in FIG. 10 where the mismatch is located at the second tag of the design-time selector, the above candidate selection procedure may select all candidate UI elements having selectors that match at least the first tag of the-design time selector.

Another exemplary candidate selection procedure may comprise selecting candidate UI elements whose selectors approximately match the design-time selector, regardless of whether whole tags are matched or not. For instance, to be selected as a candidate, a UI element may be required to share at least a subset of attribute values with the design-time target. In an embodiment wherein selectors are encoded as characters strings (e.g., XML, JSON), such approximate matching may be achieved using regular expressions and wildcard, among others.

Yet another alternative candidate selection procedure may select candidate elements from the runtime UI having the same UI element type as the intended target. For instance, if the respective target element is a button, step 220 may parse the runtime UI for elements of type 'button' and select those as candidate runtime targets.

Yet another exemplary candidate selection procedure may select candidate elements from the runtime UI according to an anchor UI element. An anchor element (or simply 'anchor') is herein defined as a UI element co-displayed with an associated target UI element, in the sense that the target and anchor are visible at the same time within the respective user interface. Furthermore, the anchor is typically located in a vicinity of the respective target, i.e., the anchor is typically closer to the target than non-anchor UI elements. The anchor element typically has a semantic connection with the associated target element, for instance they both belong to the same group/container of UI elements, and/or they perform a function together. Exemplary anchor elements associated with an input field include, among others, a text label displayed in the vicinity of the respective input field, and a title of a form that includes the respective input field. Exemplary anchor elements associated with a button include the text displayed on top of the respective button, and another button of the same UI. In some embodiments, the specification of a target UI element (as encoded in RPA script 40) may include characteristics of at least an anchor element associated with the respective target element. For instance, RPA script 40 may include a selector of the anchor element.

An exemplary candidate selection procedure using anchors may comprise identifying a runtime instance of the anchor element within the runtime UI, for instance according to a design-time selector of the anchor element included in RPA script 40. When the anchor is successfully identified, robot 12 may search the runtime UI for UI elements that satisfy a condition for being in a target-anchor relation with the identified runtime anchor. For instance, robot 12 may search the runtime UI for elements co-displayed with the identified runtime anchor, elements of a particular element type (e.g., buttons, form fields), elements that are substantially aligned with the runtime anchor and/or are located within a pre-determined distance from the identified runtime anchor. The candidate anchor elements may be selected according to an element type of the respective target element (e.g., button, text, input field, etc.). Some embodiments may search for candidate targets according to whether they belong to the same group of elements/UI container as the identified runtime anchor. For instance, when the anchor element belongs to a <div> or <span> container of an HTML document, some embodiments may select target candidates from among UI elements belonging to the same container.

Once a set of candidate target elements have been selected, in a step 222 (FIG. 9) robot 12 may determine a similarity measure quantifying a similarity between each target candidate and the actual target specified at design-time and included in RPA script 40. The similarity measure may be computed using various methods. For instance, for element characteristics expressed as character strings (e.g., selectors), an amount of similarity/mismatch may be evaluated using an inter-string distance known in the art as a string metric. One exemplary string metric known as the Levenshtein distance determines a count of operations necessary to transform one string into the other. In one such example, deleting or inserting a character counts as 1 point, while substituting a character counts as 2 points. Other inter-string distances known in the art include the Hamming distance and the Jaro-Winkler distance, among others. The compared strings may be full selectors, individual selector tags, individual attribute values, a concatenation of individual attribute values or selector tags, etc.

A string similarity measure may be normalized to the interval [0,1], for instance using the formula:

$$S = \frac{(L_C + L_T) - D}{(L_C + L_T)}, \quad [1]$$

wherein S denotes the similarity measure, D denotes the Levenshtein distance between the candidate's characteristic string and the scripted target's characteristic string, $L_C$ denotes the string length of the candidate's characteristic string, while $L_T$ denotes the string length of the target's characteristic string. Similarity measures evaluated using formula [1] are high when the candidate is similar to the target, and low when it is not.

Some embodiments pre-process the attribute values before calculating the similarity measure. In this sense, some embodiments do not match the attribute values or selectors themselves, but pre-processed values/selectors instead. Exemplary pre-processing operations include removal of blank spaces and/or other special characters (e.g., $%&?!/+ etc.), transforming all characters to lowercase, etc. In another example of pre-processing, when an attribute value contains multiple text tokens (e.g., multiple words), the respective tokens are re-ordered, for instance alphabetically according to the initial of each token. Such manipulations are specifically targeted at situations wherein a text attribute of a UI element changes between design time and runtime in a manner which preserves semantics. For instance, a window name may change from 'Application Window' to 'window of application'. Comparing the 'raw' values of the respective attribute according to a Levenshtein distance may lead to the false conclusion that the two names have nothing in common. Pre-processing by re-ordering tokens may produce a different verdict, since it would amount to comparing 'application window' to 'application of window', which are clearly similar. Some embodiments compute an aggregate similarity measure by combining a score evaluated for the 'raw' values with a score evaluated for the pre-processed values of the respective fuzzy attributes. The two individual scores may receive different weights, for instance the score corresponding to the pre-processed values may be de-emphasized with respect to the other.

Another exemplary similarity measure may be determined according to a count of attributes that differ in one selector with respect to the other. Yet other exemplary similarity measures may be computed according to visual aspects of the compared elements. For instance, some embodiments may compare an image of a candidate target to an image of the actual target included in RPA script 40, using any image similarity measure known in the art. Furthermore, a text displayed by the candidate target may be compared to a text displayed by the actual target element. Some embodiments may determine a composite similarity score combining a similarity measure determined according to the selector with a similarity measure determined according to visual aspects.

In some embodiments, in a step 224 (FIG. 9), robot 12 may present a set of candidate target elements to the user as suggestions for alternative target elements (see items 75 in FIG. 10). Some embodiments sort candidates according to their similarity to the design-time target and present candidates in order of similarity. Some embodiments further include a similarity indicator 76 explicitly indicating a degree of similarity between the respective candidate and the design-time target. To further facilitate debugging, for each candidate some embodiments further display at least a part of an image of the candidate UI element, as illustrated by item 77 in FIG. 10. The image may comprise an actual screen grab or a render of a region of the runtime UI that includes at least a part of the respective candidate element, which may be highlighted for clarity.

In some embodiments, error reporting window 70 may display target candidates in a manner which enables the user to select a candidate, for instance by clicking it with the mouse. In such embodiments, in a step 226 robot 12 may receive user input indicating a selected candidate as runtime target for the current RPA activity. In response, robot 12 may attempt to carry out the respective activity on the selected candidate UI element.

Figure 11:
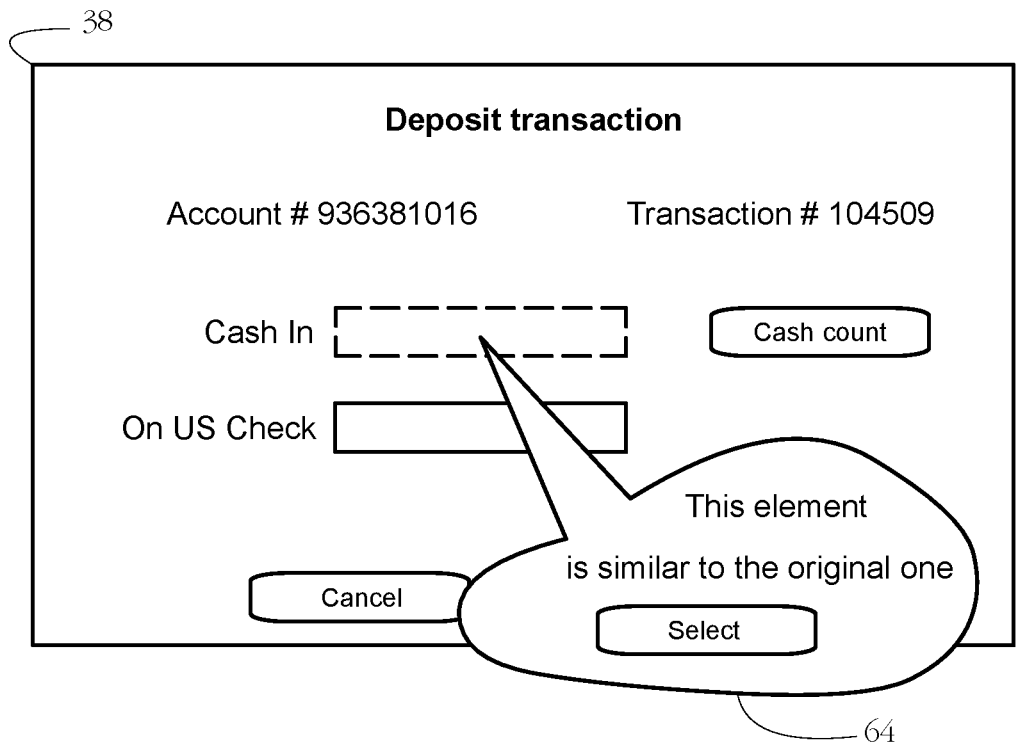
FIG. 11 illustrates an exemplary visual tool for facilitating selection of an alternative runtime target according to some embodiments of the present invention.

In some embodiments, error reporting window 70 may include an interactive element (e.g., a button as illustrated by item 79 in FIG. 10) which enables a user to indicate an alternative target UI directly on the runtime UI. Invoking the respective interactive element (e.g., clicking button 79) may invoke the respective user interface. FIG. 11 illustrates such an embodiment, wherein robot 12 is configured to display a target selection dialog 64 pointing to a candidate target element of the runtime UI and including a button that enables the user to select the respective candidate as the new runtime target for the current activity.

Figure 12:
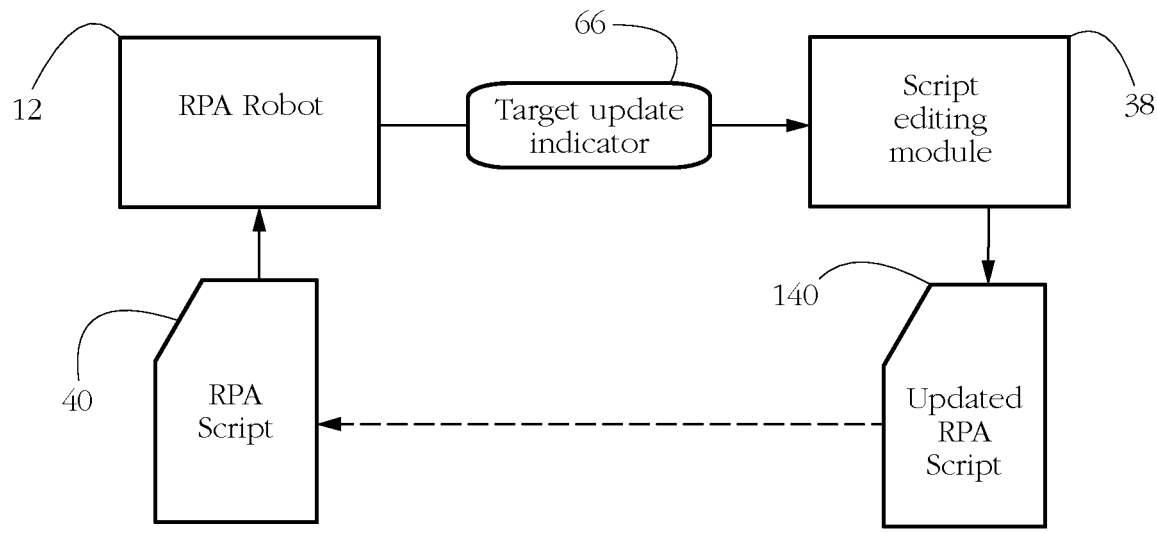
FIG. 12 shows an exemplary mechanism for updating RPA scripts in response to successful debugging, according to some embodiments of the present invention.

FIG. 12 shows an exemplary mechanism for updating RPA scripts in response to successful debugging. In some embodiments, in response to receiving user input indicating a new target element for a selected activity, robot 12 may transmit a target update indicator 66 to a script editing module 38, which may execute on same RPA host as robot 12 or remotely, on another host being part of the respective RPA environment. Target update indicator 66 may comprise an indicator of a selected RPA script 40, an indicator of a selected RPA activity, and an indicator of a selected target UI element (e.g., a runtime selector characterizing the respective target). These indicators may collectively communicate to script editing module 38 to update the respective RPA script by changing the current target for the respective RPA activity to the new target specified by target update indicator 66. Module 38 may carry out the respective edit, to produce an updated RPA script 140 which may be further distributed to robots executing the respective automation. Debugging an RPA script may thus produce swift effects across the entire RPA environment.

Figure 13:
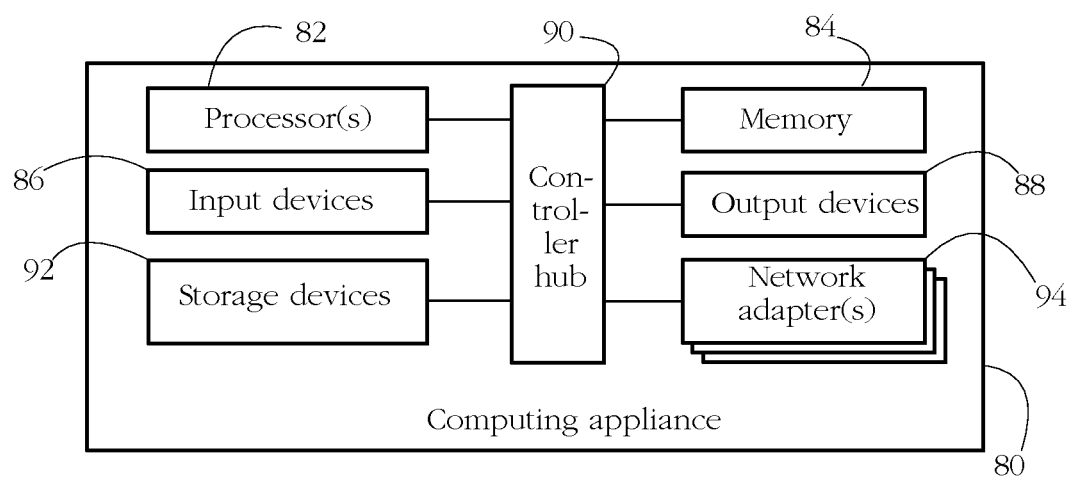
FIG. 13 shows an exemplary hardware configuration of a computing device configured to execute some embodiments of the present invention.

FIG. 13 shows an exemplary hardware configuration of a computing appliance 80 programmed to execute some of the methods described herein. Appliance 80 may represent any of RPA host platforms 20a-e in FIG. 3. The illustrated appliance is a personal computer; other computing devices such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 84 may comprise volatile computer-readable media (e.g. dynamic random-access memory—DRAM) storing data and/or instructions accessed or generated by processor(s) 82 in the course of carrying out operations. Input devices 86 may include computer keyboards, mice, and microphones, among others, including the respective hardware interfaces and/or adapters allowing a user to introduce data and/or instructions into appliance 80. Output devices 88 may include display devices such as monitors and speakers among others, as well as hardware interfaces/adapters such as graphic cards, enabling the respective computing device to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 include mechanical, electrical, and signaling circuitry for communicating data over physical links coupled to an electronic communication network (e.g, FIG. 3) and/or to other devices/computer systems. Adapter(s) 94 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of appliance 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

It will also be apparent to one of ordinary skill in the art that aspects of the invention as described above may be implemented in various forms of software, firmware, and hardware, or a combination thereof. For example, certain portions of the invention may be described as specialized hardware logic that performs one or more functions. This specialized logic may include an application specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described above facilitate the design and debugging of RPA robots by making such activities more accessible and attractive to developers that lack a formal programming background. The automatic identification of activity targets, i.e., user interface elements acted upon by robotic software, poses a substantial technical problem because typically, the target user interface (e.g., an e-commerce webpage, an accounting interface, etc.) is developed and maintained independently of the robot designed to interact with the respective interface. Therefore, the functionality and/or appearance of the target UI may change without the knowledge of RPA developers. Such changes may compromise the execution of the robot and may entail costly and cumbersome debugging. Some embodiments of the present invention are specifically directed at facilitating such debugging activities.

When designing robotic software (a stage of automation commonly known as design-time), the RPA developer typically invokes an instance of the target UI and indicates a target element and an activity to be performed on the respective target element. For instance, the developer may indicate a button of the target UI and configure the robot to click on the respective button. In another example, the developer may indicate an input field and configure the robot to type some text into the respective input field. In yet another example, the developer may indicate a text box of the user interface and configured the robot to grab the content of the respective text box. The resulting robot code may include an indicator of the target element and an indicator of the respective activity. The robot code may then be distributed to RPA clients.

In another stage of automation commonly known as runtime, an RPA host machine may execute the respective robot, which may attempt to interact with a runtime instance of the target UI. However, the runtime UI may not be identical to the design-side UI. For instance, when the target UI comprises a web interface, and especially when the respective robot is designed to interact with a complex website, the respective user interface may change frequently, sometimes multiple times in the course of a single day. Web developers of the respective website may tweak the appearance, for instance changing a position of a button, changing the composition of a menu, and/or changing the color scheme, fonts, and size of various elements.

Some RPA systems attempt to identify a runtime target by searching the runtime UI for a UI element that exactly matches a set of characteristics of the design-time target. Such characteristics may comprise an element ID/selector specified according to the source code or data structure underlying the respective user interface (for instance, the HTML code that specifies the appearance and content of a webpage). Such systems and methods may fail when the name or other attribute of the respective element unexpectedly changes. In response to a failure to identify the runtime target, the robot typically suspends execution and warns a user of the respective RPA host. However, conventional warnings typically provide very limited information on the cause of the failure. Furthermore, debugging the robot may require a level of knowledge of RPA software, user interfaces, and of the application targeted for automation (e.g., browser, spreadsheet application, etc.) which is expected to exceed that of the average developer.

In contrast to conventional RPA systems and software, some embodiments of the present inventions substantially expand the robot's error reporting, specifically aiming to provide key information that facilitates debugging, making such interventions more accessible to developers lacking a technical background or a formal training in computer programming. In response to a failure to find a runtime UI element exactly matching a selector of the design-time target, some embodiments explicitly indicate the part of the design-time selector which could not be matched at runtime. For instance, some embodiments explicitly display a set of selector tags which could not be matched.

Some embodiments further indicate a set of alternative runtime targets which closely resemble the design-time target, and may further display a similarity measure indicative of a degree of similarity between each alternative target and the design-time target specified in the robot's script. Displaying alternative target(s) may facilitate debugging in at least two ways. First, it may enable a developer to pinpoint and interpret the differences between the design-time and runtime user interfaces, or stated otherwise, to determine whether and how the respective interface has changed between design time and runtime. For instance, displaying an alternative target may help the developer understand whether the respective failure was caused by an RPA coding error or by a change in the code of the respective user interface. In case the mismatch was caused by a change in the interface itself, displaying an alternative target may help reveal a logic of the change, for instance a new element naming convention, a new manner of organizing the respective interface, etc. Such knowledge may substantially facilitate debugging and maintenance of the robot, and may even lead a developer to a new RPA strategy that would be more robust to future changes in the respective interface.

A second manner in which displaying alternative targets may facilitate debugging is that it may provide a straightforward and intuitive way of fixing the robot by redirecting it to the correct target element so that it may continue executing the current automation. In some embodiments, the display of alternative targets is interactive, in the sense that clicking on an alternative target automatically instructs the robot to apply the current automation activity to the respective alternative target. Furthermore, the RPA code of the robot may be automatically updated to reflect redirection of the respective automation activity to the new target UI element.

It will be clear to a skilled artisan that robot debugging as described herein may be carried out locally or remotely. In an embodiment wherein the RPA host executing the robot is distinct from the machine interacting with the developer that carries out the debugging procedure (for instance when RPA robot 12 executes in a cloud computing environment), the respective RPA host may generate the content of the error message, log entry, and/or error reporting window (see e.g., exemplary window 70 in FIG. 10). The respective content may then be transmitted remotely to the developer's machine using a protocol such as HTTP.

It will be clear to one skilled in the art that the above embodiments may be altered in many ways without departing from the scope of the invention. Accordingly, the scope of the invention should be determined by the following claims and their legal equivalents.

What is claimed is:

1. A robotic process automation (RPA) method comprising employing at least one hardware processor of a computer system to execute a software robot configured to apply an RPA activity to a target element of a user interface (UI), the RPA activity mimicking an interaction of a human operator with the target element, wherein executing the software robot comprises:
in response to receiving an RPA script indicating a plurality of characteristics of the target element, searching the UI for UI elements matching all of the plurality of characteristics of the target element,
wherein the plurality of characteristics comprises an ordered sequence of tags, each tag of the ordered sequence indicating a distinct node of a tree representation of the UI; and
in response to searching the UI, when no element of the UI matches all of the plurality of characteristics of the target element,
displaying an error message to a user of the computer system, the error message selectively showing at least one characteristic of the plurality of characteristics of the target element that is not matched in any UI element of the UI.

2. The method of claim 1, further comprising displaying to the user:
a selected tag of the ordered sequence of tags, the selected tag not matched in any UI element of the UI; and
an indicator of a position of the selected tag within the ordered sequence of tags.

3. The method of claim 1, further comprising presenting to the user a plurality of candidate elements, the plurality of candidate elements ordered according to a similarity between each member of the plurality of candidate elements and the target element.

4. The method of claim 1, wherein the target element comprises an item selected from a group consisting of a UI window, a menu, a button, a text area, and a form field.

5. A computer system comprising at least one hardware processor configured to execute a software robot configured to apply a robotic process automation (RPA) activity to a target element of a user interface (UI), the RPA activity mimicking an interaction of a human operator with the target element, wherein executing the software robot comprises:
in response to receiving an RPA script indicating a plurality of characteristics of the target element, searching the UI for UI elements matching all of the plurality of characteristics of the target element,
wherein the plurality of characteristics comprises an ordered sequence of tags, each tag of the ordered sequence indicating a distinct node of a tree representation of the UI; and
in response to searching the UI, when no element of the UI matches all of the plurality of characteristics of the target element,
displaying an error message to a user of the computer system, the error message selectively showing at least one characteristic of the plurality of characteristics of the target element that is not matched in any UI element of the UI.

6. The computer system of claim 5, wherein executing the robot further comprises displaying to the user:
a selected tag of the ordered sequence of tags, the selected tag not matched in any UI element of the UI; and
an indicator of a position of the selected tag within the ordered sequence of tags.

7. The computer system of claim 5, wherein executing the robot further comprises presenting to the user a plurality of candidate elements, the plurality of candidate elements ordered according to a similarity between each member of the plurality of candidate elements and the target element.

8. The computer system of claim 5, wherein the target element comprises an item selected from a group consisting of a UI window, a menu, a button, a text area, and a form field.

9. A non-transitory computer-readable medium storing instructions which, when executed by at least one hardware processor of a computer system, cause the computer system to execute a software robot configured to apply a robotic process automation (RPA) activity to a target element of a user interface (UI), the RPA activity mimicking an interaction of a human operator with the target element, wherein executing the software robot comprises:
in response to receiving an RPA script indicating a plurality of characteristics of the target element, searching the UI for UI elements matching all of the plurality of characteristics of the target element, wherein the plurality of characteristics comprises an ordered sequence of tags, each tag of the ordered sequence indicating a distinct node of a tree representation of the UI; and in response to searching the UI, when no element of the UI matches all of the plurality of characteristics of the target element, displaying an error message to a user of the computer system, the error message selectively showing at least one characteristic of the plurality of characteristics of the target element that is not matched in any UI element of the UI.

* * * * *